US012644751B2

(12) United States Patent
Ohlsson et al.

(10) Patent No.:  US 12,644,751 B2
(45) Date of Patent:      Jun. 2, 2026

(54) RADAR LEVEL GAUGE SYSTEM WITH A CONICAL DIELECTRIC ANTENNA BODY

(71) Applicant: Rosemount Tank Radar AB, Mölnlycke (SE)

(72) Inventors: Magnus Ohlsson, Norsholm (SE); Carl Fjelkner, Mölnlycke (SE); Thomas Örtenberg, Edina, MN (US)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 264 days.

(21) Appl. No.: 18/418,530

(22) Filed: Jan. 22, 2024

(65) Prior Publication Data

US 2024/0271984 A1     Aug. 15, 2024

(30) Foreign Application Priority Data

Feb. 15, 2023   (EP) ..................................... 23156717

(51) Int. Cl.
  *G01F 23/284*       (2006.01)
(52) U.S. Cl.
  CPC ................................. *G01F 23/284* (2013.01)
(58) Field of Classification Search
  CPC .................................................... G01F 23/284
  See application file for complete search history.

(56) References Cited

U.S. PATENT DOCUMENTS

| | | | |
|---|---|---|---|
| 6,779,397 B2 | 8/2004 | Burger et al. | |
| 6,859,187 B2 | 2/2005 | Ohlsson | |
| 2006/0005621 A1* | 1/2006 | Lenk ..................... | G01F 23/284 |
| | | | 73/290 V |

(Continued)

FOREIGN PATENT DOCUMENTS

| | | |
|---|---|---|
| CN | 1592845 B | 5/2010 |
| CN | 110854541 A | 2/2020 |

(Continued)

OTHER PUBLICATIONS

Extended Search Report from European Patent Application No. 23156717.3, dated Jul. 18, 2023.

*Primary Examiner* — William Kelleher
*Assistant Examiner* — Hailey R Le
(74) *Attorney, Agent, or Firm* — Westman, Champlin & Koehler, P.A.

(57)          ABSTRACT

A radar level gauge system, for determining a filling level of a product in a tank, comprises a transceiver, an antenna assembly, and processing. The antenna assembly comprises a dielectric antenna body having a conical external surface facing an interior of the tank and an internal surface facing away from the interior of the tank, when the antenna assembly is arranged at the opening in the tank wall, and an antenna feed coupled to the transceiver, and configured to propagate the transmit signal towards the internal surface of the dielectric antenna body as electromagnetic waves with convex wavefronts. The internal surface of the dielectric antenna body is shaped to refract the transmit signal from the antenna feed in such a way that the transmit signal propagates towards the surface of the product in the tank as electromagnetic waves with substantially planar wavefronts, following passage through the dielectric antenna body.

15 Claims, 5 Drawing Sheets

(56)  References Cited

U.S. PATENT DOCUMENTS

| 2006/0225499 A1 * | 10/2006 | Gravel | .................. G01F 23/284 |
| | | | 73/290 V |
| 2009/0212996 A1 | 8/2009 | Chen et al. | |
| 2010/0066594 A1 * | 3/2010 | Kienzle | .................. H01Q 13/02 |
| | | | 343/753 |
| 2010/0321262 A1 | 12/2010 | Pohl | |
| 2012/0262331 A1 | 10/2012 | Kienzle et al. | |
| 2013/0113500 A1 | 5/2013 | Chen et al. | |
| 2014/0266862 A1 * | 9/2014 | Fredriksson | .......... G01F 23/284 |
| | | | 342/124 |
| 2018/0348040 A1 * | 12/2018 | Kleman | .................. G01S 13/88 |
| 2019/0369230 A1 * | 12/2019 | Fredriksson | ........... H01Q 1/225 |

FOREIGN PATENT DOCUMENTS

| DE | 102014103378 A1 | 9/2015 |
| DE | 102016114772 B4 | 9/2022 |

* cited by examiner

1

RADAR LEVEL GAUGE SYSTEM WITH A CONICAL DIELECTRIC ANTENNA BODY

CROSS-REFERENCE TO RELATED APPLICATION

This application claims priority to European Patent Application No. 23156717.3, filed Feb. 15, 2023, the content of which is hereby incorporated by reference in its entirety.

TECHNICAL FIELD OF THE INVENTION

The present invention relates to a radar level gauge system.

TECHNICAL BACKGROUND

Radar level gauge (RLG) systems are in wide use for determining filling levels in tanks. An electromagnetic transmit signal is generated by a transceiver and propagated towards the surface of the product in the tank, and an electromagnetic reflection signal resulting from reflection of the transmit signal at the surface is propagated back towards to the transceiver. Based on a timing relation between the transmit signal and the reflection signal, the distance to the surface of the product can be determined.

In some applications, the radar level gauge system may include a protective member facing an interior of the tank, for protecting the radar level gauge system from product contamination. To improve drip-off of product, the protective member may be generally cone-shaped.

It would be desirable to provide an improved radar level gauge system, providing for improved performance in applications prone to product contamination.

SUMMARY

In view of the above, a general object of the present invention is to provide an improved radar level gauge system, providing for improved performance in applications prone to product contamination.

According to an aspect of the present invention, it is therefore provided a radar level gauge system, for determining a filling level of a product in a tank, the radar level gauge system comprising: a transceiver configured to generate, transmit and receive electromagnetic signals; an antenna assembly configured to be arranged at an opening in a tank wall for radiating an electromagnetic transmit signal from the transceiver vertically towards the product in the tank, and to return an electromagnetic reflection signal resulting from reflection of the transmit signal at a surface of the product back towards the transceiver; and processing circuitry configured to determine the filling level based on the transmit signal and the reflection signal, the antenna assembly comprising: a dielectric antenna body having a conical external surface facing an interior of the tank and an internal surface facing away from the interior of the tank, when the antenna assembly is arranged at the opening in the tank wall; and an antenna feed coupled to the transceiver, and configured to propagate the transmit signal towards the internal surface of the dielectric antenna body as electromagnetic waves with convex wavefronts, the internal surface of the dielectric antenna body being shaped to refract the transmit signal from the antenna feed in such a way that the transmit signal propagates towards the surface of the product in the tank as electromagnetic waves with substantially planar wavefronts, following passage through the dielectric antenna body.

High-frequency non-contact radar level gauge measurement provides several advantages, such as a narrower measurement beam and more compact dimensions. The latter in particular allows for installation of the radar level gauge system in various tanks where pre-existing openings may be too small for conventional non-contact radar level gauge systems with lower frequencies, such as around 26 GHz or less.

The present invention is based on the realization that a high-frequency non-contact radar level gauge system can be adapted to applications prone to product contamination in a way that achieves plane wave propagation of the transmit signal towards the surface of the product, by providing the radar level gauge system with a dielectric antenna body that has a conical external surface exposed to the tank interior, and a wave-forming internal surface facing away from the tank interior.

The geometry of the wave-forming internal surface is selected, in relation to the incoming wavefronts from the antenna feed and the external surface geometry, to achieve a first refraction of the transmit signal resulting in internally propagating wavefronts that are shaped in such a way that a second refraction at the conical external surface results in substantially planar wavefronts propagating towards the product.

Plane wave propagation of the transmit signal increases the proportion of the power of the transmit signal that can be reflected back towards the radar level gauge system.

Furthermore, by providing the wave-forming functionality and the contamination mitigation functionality in the same dielectric antenna body, a compact design, with few parts is provided for. This may further increase the usability and ease of installation of the radar level gauge system.

According to various embodiments, a cross-section of the internal surface of the dielectric antenna body with a plane including an optical axis of the dielectric antenna body may be a superposition of a cross-section of the external surface of the dielectric antenna body with the plane, and a hyperbola branch. With this configuration, the desired shape of the wavefronts propagating inside the dielectric antenna body from the internal surface towards the external surface can be achieved. The hyperbola branch may be chosen depending on the dielectric constant of the dielectric antenna body.

In embodiments, the dielectric antenna body may be made of a non-plastic dielectric, which may allow the dielectric antenna body to maintain its shape also when subjected to high temperature and high pressure (HTHP). This may contribute to expanding the range of applications for which the radar level gauge system is suitable.

In summary, aspects of the present invention thus relate to a radar level gauge system, for determining a filling level of a product in a tank, comprises a transceiver, an antenna assembly, and processing. The antenna assembly comprises a dielectric antenna body having a conical external surface facing an interior of the tank and an internal surface facing away from the interior of the tank, when the antenna assembly is arranged at the opening in the tank wall, and an antenna feed coupled to the transceiver, and configured to propagate the transmit signal towards the internal surface of the dielectric antenna body as electromagnetic waves with convex wavefronts. The internal surface of the dielectric antenna body is shaped to refract the transmit signal from the antenna feed in such a way that the transmit signal propagates towards the surface of the product in the tank as electromagnetic waves with substantially planar wavefronts, following passage through the dielectric antenna body.

BRIEF DESCRIPTION OF THE DRAWINGS

These and other aspects of the present invention will now be described in more detail, with reference to the appended drawings, wherein.

DETAILED DESCRIPTION OF EXAMPLE EMBODIMENTS OF THE INVENTION

In the following detailed description, embodiments of the present invention are in part described in the context of an HTHP (high temperature high pressure) application. It should be noted that the radar level gauge system of the present disclosure is not limited for use in HTHP applications, but that it is suitable for use in various other level gauging applications, in particular any level gauging applications where splashing and/or condensation may occur.

Figure 1:
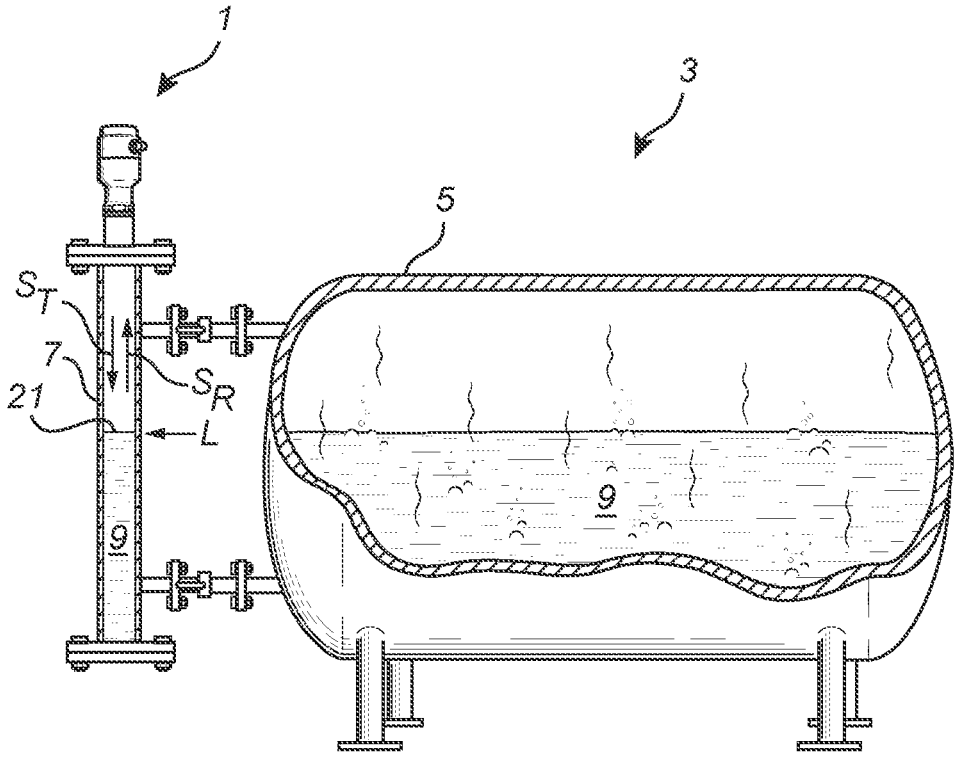
FIG. 1 schematically shows a radar level gauge system according to an example embodiment of the present invention in an exemplary application.

FIG. 1 schematically shows a radar level gauge system 1 according to an example embodiment of the present invention in an exemplary application. In the example illustrated in FIG. 1, the application is a simplified boiler 3, with a boiler drum 5, and a chamber 7 (often also referred to as a bridle). The boiler drum 5 is in fluid communication with the chamber 7 so that the level L of product 9 (in this case water) in the chamber 7 corresponds to the level in the boiler drum 5. Thus, the boiler drum 5 and the chamber 7 together form a tank, and the opening at the top of the chamber 7 is an opening in the tank wall.

Figure 2:
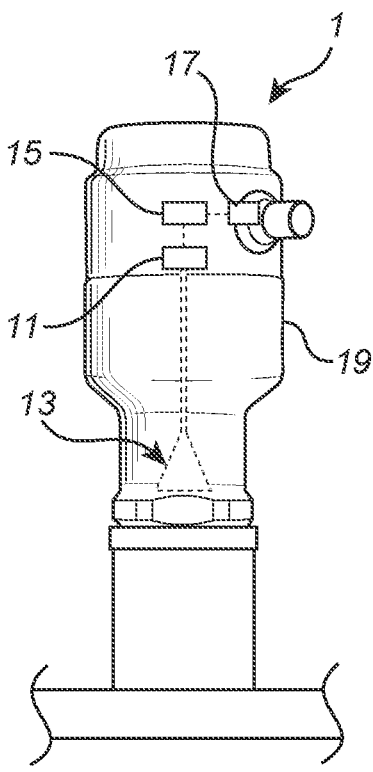
FIG. 2 is a block diagram schematically illustrating the radar level gauge system in FIG. 1.

With reference to FIG. 2, the radar level gauge system 1 in FIG. 1 comprises a transceiver 11, an antenna assembly 13, processing circuitry 15, and a communication interface 17 inside a housing 19. The transceiver 11 is configured to generate, transmit and receive electromagnetic signals. The transceiver 11 may be configured to generate electromagnetic signals having a center frequency of at least 40 GHz. Preferably, the center frequency may be at least 60 GHZ, and most preferably, the center frequency may be in the range 75 GHZ-85 GHz. The antenna assembly 13 is configured for arrangement at an opening in the tank wall, as is schematically shown in FIG. 1, for radiating an electromagnetic transmit signal ST from the transceiver 11 vertically towards the product in the tank 3, and to return an electromagnetic reflection signal SR resulting from reflection of the transmit signal ST at a surface 21 (FIG. 1) of the product 9 back towards the transceiver 11. The processing circuitry 15 is coupled to the transceiver 11, and configured to determine the filling level L based on the transmit signal ST and the reflection signal SR, using per se known techniques. The determined filling level L may be communicated to a remote host using the communication interface 17, which may be any suitable wired or wireless communication interface in the art. It should be noted that the opening in the tank wall may alternatively be provided in the wall of the boiler drum 5, and that the antenna assembly 13 may be arranged at such an opening to measure the level L in the boiler drum 5 directly. In such a configuration, there may be a ball valve between the interior of the boiler drum 5 and the antenna assembly 13.

The "transceiver" may be one functional unit capable of transmitting and receiving electromagnetic signals, or may be a system comprising separate transmitter and receiver units.

It should be noted that the processing circuitry may be provided as one device or several devices working together.

Figure 3:
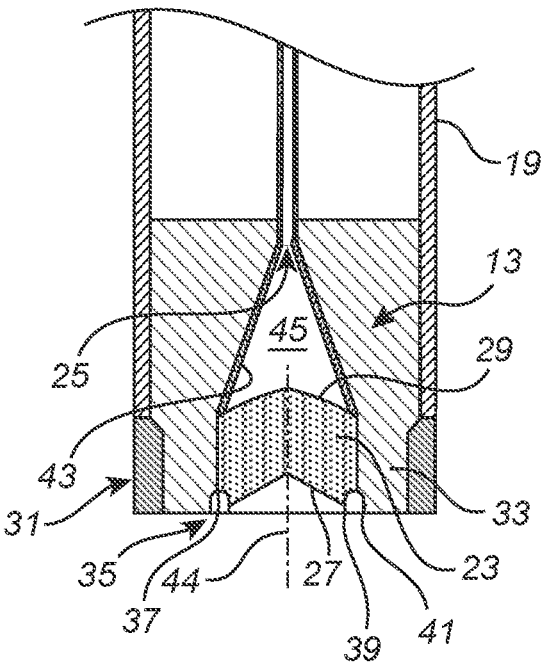
FIG. 3 is a schematic cross-section view of a first example of an antenna assembly configuration that may be comprised in the radar level gauge system in FIG. 2.

Initially referring to the first example configuration in FIG. 3, the antenna assembly 13 included in embodiments of the radar level gauge system 1 according to the present invention comprises a dielectric antenna body 23 and an antenna feed 25. The dielectric antenna body 23 has a conical external surface 27 facing an interior of the tank 3 and an internal surface 29 facing away from the interior of the tank 3, when the antenna assembly 13 is arranged at the opening in the tank wall. The antenna feed 25 is coupled to the transceiver 11, as is schematically indicated in FIG. 2.

In embodiments, the radar level gauge system 1 may further comprise a tank interface structure 31, here in the form of a thread, for fixing the radar level gauge system 1 to the tank wall, and a housing structure 33 holding the dielectric antenna body 23 in relation to the feed 25 and in relation to the tank interface structure 31.

The antenna assembly 13 comprised in the radar level gauge system 1 in FIG. 2 is suitable both for the high frequency of the transmitted and received signals and for use in applications prone to product contamination (and condensation of water vapor etc). In embodiments of the radar level gauge system 1, the antenna assembly may be configured for the particular challenges associated with HTHP-applications. An HTHP-application may be classified as an application where the antenna assembly 13 may be subjected to a pressure of up to 400 bar and a temperature of up to 450° C. Such severe process conditions lead to requirements on the mechanical integrity of the components included in the antenna assembly 13, even for very high temperatures. In such embodiments, the dielectric antenna body 23 may advantageously be non-plastic, and may advantageously be made of a suitable ceramic or glass. Examples of suitable ceramics include alumina, Macor®, and Vitro 800 Ceramic. The latter two are examples of machinable high-temperature ceramics supplied by the company Final Advanced Materials of France. As an alternative to a ceramic material, a suitable glass material may be used, for example fused quartz or similar.

For HTHP-applications (and optionally for other applications), there may be a gas-tight connection between the lens—the dielectric antenna body 23—and the housing structure 33. According to embodiments, this may be achieved by a brazing joint 35. As is indicated in FIG. 3, this brazing joint 35 may include a metal ring 37 with a C-shaped cross-section, a first joint 39 formed by brazing between the (non-plastic) dielectric antenna body 23 and the metal ring 37 (one leg of the C), and a second joint 41 formed by brazing or welding between the housing structure 33 and the metal ring 37 (the other leg of the C).

Since various configurations of the antenna feed 25 may have side lobes spilling energy onto the interior walls of the housing structure 33, the antenna assembly 13 may advantageously comprise a microwave-absorbing envelope 43 enclosing a space 45 between the feed 25 and the dielectric antenna body 23. Preferably, the microwave-absorbing envelope 43 may be made of a temperature-resistant material, such as a woven or non-woven carbon fiber-based structure. Alternatively, microwave-absorbing envelope 43 may be a ceramic doped with microwave-absorbing material.

Figure 4:
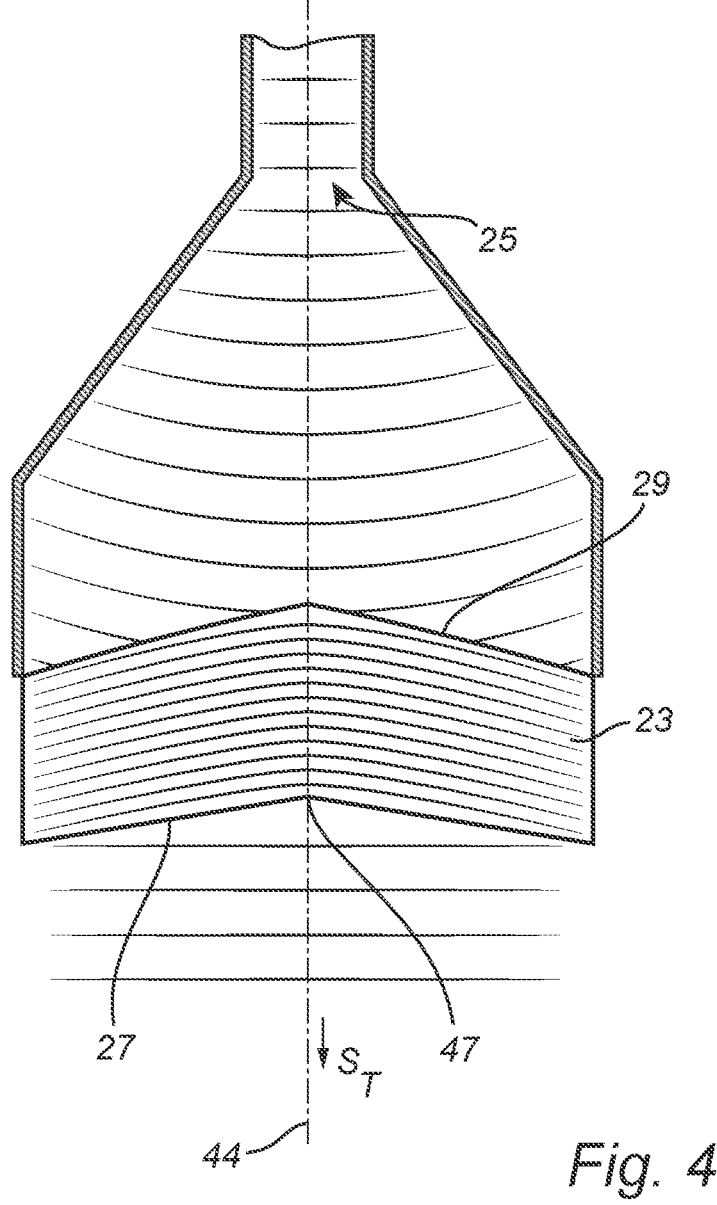
FIG. 4 is a schematic illustration of the wavefronts of the transmit signal in different parts of the antenna assembly in FIG. 3.

FIG. 4 is a schematic illustration of the wavefronts of the transmit signal ST in different parts of the antenna assembly in FIG. 3. Referring to FIG. 4, the antenna feed 25 is configured to propagate the transmit signal towards the internal surface 29 of the dielectric antenna body 23 as electromagnetic waves with convex wavefronts. In the example configuration of FIG. 4 (and FIG. 3), the antenna feed 25 is a conical waveguide section, that is coupled to the transceiver 11 by a straight waveguide section. From the antenna feed 25, there may be propagation of electromagnetic waves with spherical, or near spherical, wavefronts. The internal surface 29 of the dielectric antenna body 23 is shaped to refract the transmit signal from the antenna feed 25 in such a way that the transmit signal ST propagates towards the surface of the product 9 in the tank 3 as electromagnetic waves with substantially planar wavefronts, following passage through the dielectric antenna body 23, and refraction by the external surface 27 of the dielectric antenna body 23.

Through the configuration of the dielectric antenna body 23, with the conical external surface 27 and the internal surface 29 shaped to refract the incoming transmit signal ST so that it is collimated, in a way that is adapted to the shape of the conical external surface, as well as to the dielectric constant of the dielectric antenna body 23, an advantageous drip-off configuration with a discontinuous cone apex can be combined with plane wave propagation towards the surface of the product 9. The latter provides for efficient use of the radiated power and for a narrow beam, which makes the radar level gauging relatively insensitive to interference from disturbing structures that may be present inside the tank 3.

To achieve the desired beam shaping (wavefront shaping) by the internal surface 29 of the dielectric antenna body 23, a cross-section of the internal surface 29 of the dielectric antenna body 23 with a plane including an optical axis 44 of the dielectric antenna body 23 may advantageously be a superposition of a cross-section of the external surface 27 of the dielectric antenna body 23 with the plane, and a hyperbola branch. As will be immediately evident to the skilled person, the configuration of the hyperbola branch will depend on the dielectric constant of the dielectric antenna body 23. It is anticipated that the media adjacent to the external surface 27 and the internal surface 29, respectively will have a dielectric constant close to that of air in most applications. If this should not be the case, the dielectric constant(s) of such media should also be taken into account when designing the dielectric antenna body 23. A person of ordinary skill in the art will be able to determine a suitable shape of the internal surface 29 using basic knowledge of the material properties of the dielectric antenna body 23 (and surrounding media if applicable) in combination with commercially available microwave lens simulation software.

Figure 5:
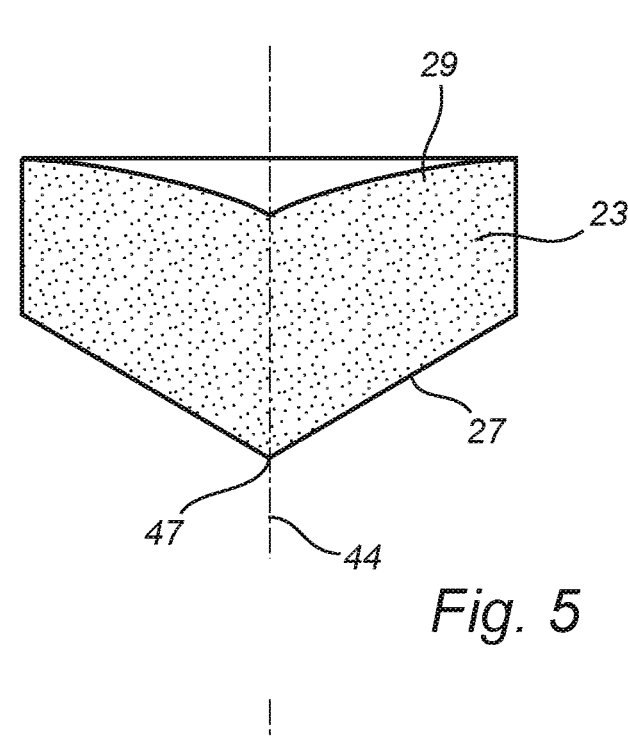
FIG. 5 is a schematic illustration of an alternative dielectric antenna body configuration, with the apex of the conical external surface pointing towards the product in the tank.

So far, the dielectric antenna body 23 has been shown to have the apex 47 of the conical external surface 29 pointing away from the product 9 in the tank, and into the dielectric antenna body 23. FIG. 5 is a schematic illustration of an alternative dielectric antenna body 23 configuration, that may be included in the antenna assembly 13 in FIG. 3, with the apex 47 of the conical external surface 29 pointing towards the product 9 in the tank 3. As is schematically indicated in FIG. 5, the different configuration of the conical external surface 29 results in a different configuration of the internal surface 27.

Figure 6A:
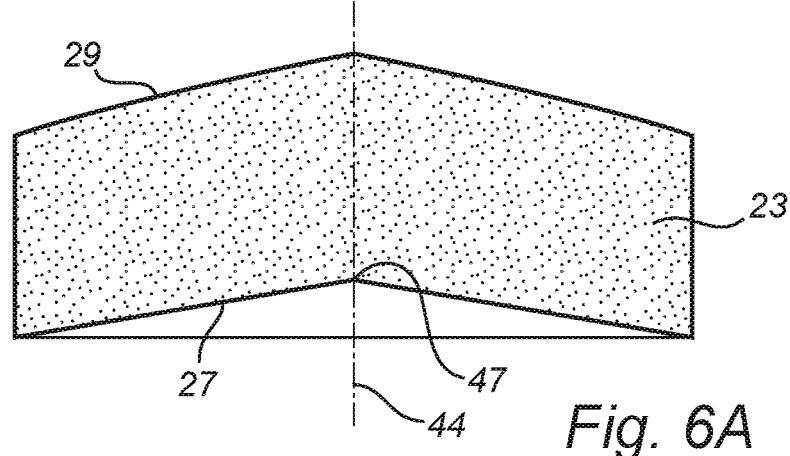
FIGS. 6A-B are schematic illustrations of alternative dielectric antenna body configurations, with the apex of the conical external surface pointing away from the product in the tank.
Figure 6B:
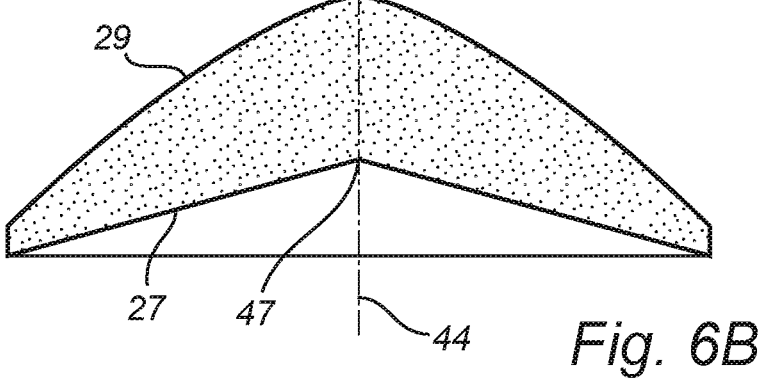

As has been mentioned above, embodiments of the radar level gauge system 1 according to the present invention may comprise a non-plastic dielectric antenna body 23, and other embodiments may comprise a plastic dielectric antenna body 23. It has also been explained that the antenna body 23 will be designed differently depending on the dielectric constant of the antenna body material. FIGS. 6A-B are schematic illustrations of alternative dielectric antenna body configurations, that may be included in the antenna assembly 13 in FIG. 3, with the apex 47 of the conical external surface 29 pointing away from the product 9 in the tank 3, when the radar level gauge system 1 is installed to measure the level of product 9 in the tank 3. The dielectric antenna body 23 in FIG. 6A is made of a ceramic, and has a relative dielectric constant of 9.4. In this example configuration, the opening angle of the cone formed by the external surface 27 is 160°. The dielectric antenna body 23 in FIG. 6B is made of a plastic material, and has a relative dielectric constant of 2.3. In this example configuration, the opening angle of the cone formed by the external surface 27 is 150°. As can be seen in FIGS. 6A-B, the shapes of the interior surfaces 29 of the two dielectric antenna bodies differ significantly, mainly due to the difference in relative dielectric constant.

Figure 7A:
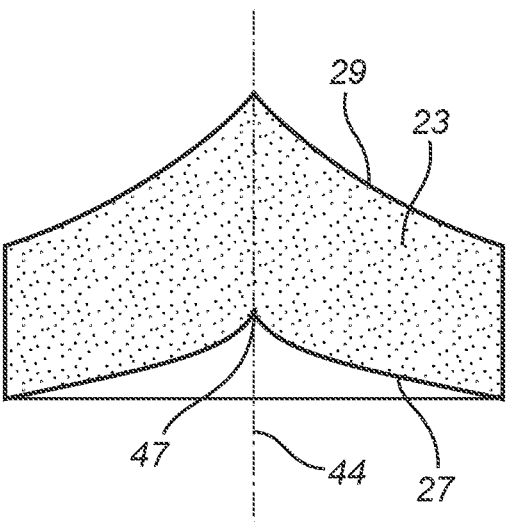
FIGS. 7A-B are schematic illustrations of alternative dielectric antenna body configurations, with the conical external surface forming a concave cone and a convex cone, respectively.
Figure 7B:
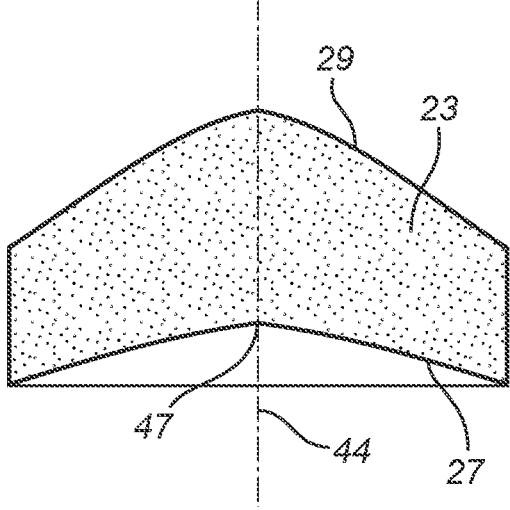

So far, various example configurations of the dielectric antenna body 23 have been shown, each of which has an external surface 27 forming an envelope of a straight cone, so that any cross-section of the external surface 27 with a plane including the optical axis 44 is the legs and apex of an isosceles triangle. In embodiments, other cone configurations may be beneficial. FIGS. 7A-B are schematic illustrations of such alternative dielectric antenna body configurations, that may be included in the antenna assembly 13 in FIG. 3, with the conical external surface 27 forming a concave cone and a convex cone, respectively. As was described further above, the internal surface 29 may still advantageously be a superposition of the external surface 27 and a suitable hyperbolic surface.

In the exemplary dielectric antenna body configurations described herein, and illustrated by the drawings, a distance, in a direction parallel to the optical axis 44 of the dielectric antenna body 23, between the external surface 27 and the internal surface 29 of the dielectric antenna body 23 is greater along the optical axis 44 than at a periphery of the dielectric antenna body 23.

Furthermore, in various embodiments, a distance between the external surface 27 and the internal surface 29 of the dielectric antenna body 23 is greater along the optical axis 44 of the dielectric antenna body 23 than any other distance, in a direction parallel to the optical axis 44, between the external surface 27 and the internal surface 29 of the dielectric antenna body 23.

This results in a greater delay at the optical axis 44, which provides for the desired plane/flat wavefronts of the transmit signal ST after having passed through the dielectric antenna body 23, schematically illustrated in FIG. 4.

It should also be mentioned that the dielectric antenna body 23 may advantageously be rotationally symmetrical in respect of the optical axis 44, since this may simplify the design and manufacture of the dielectric antenna body 23. There may, however, be applications that may benefit from a non-symmetrical configuration of the dielectric antenna body 23, for instance to shape the radar beam transmitted towards the surface of the product 9.

The person skilled in the art realizes that the present invention by no means is limited to the preferred embodiments described above. On the contrary, many modifications and variations are possible within the scope of the appended claims.

The invention claimed is:

1. A radar level gauge system, for determining a filling level of a product in a tank, the radar level gauge system comprising:

a transceiver configured to generate, transmit and receive electromagnetic signals;

an antenna assembly configured to be arranged at an opening in a tank wall for radiating an electromagnetic transmit signal from the transceiver vertically towards the product in the tank, and to return an electromagnetic reflection signal resulting from reflection of the transmit signal at a surface of the product back towards the transceiver; and processing circuitry configured to determine the filling level based on the transmit signal and the reflection signal, the antenna assembly comprising:

a dielectric antenna body having a conical external surface facing an interior of the tank and an internal surface facing away from the interior of the tank, when the antenna assembly is arranged at the opening in the tank wall; and an antenna feed coupled to the transceiver, and configured to propagate the transmit signal towards the internal surface of the dielectric antenna body as electromagnetic waves with convex wavefronts, the internal surface of the dielectric antenna body being shaped to refract the transmit signal from the antenna feed in such a way that the transmit signal propagates towards the surface of the product in the tank as electromagnetic waves with substantially planar wavefronts, following passage through the dielectric antenna body.

2. The radar level gauge system according to claim 1, a cross-section of the internal surface of the dielectric antenna body with a plane including an optical axis of the dielectric antenna body being a superposition of a cross-section of the external surface of the dielectric antenna body with the plane, and a hyperbola branch.

3. The radar level gauge system according to claim 1, the dielectric antenna body rotationally symmetric about an optical axis of the dielectric antenna body.

4. The radar level gauge system according to claim 1, a distance, in a direction parallel to an optical axis of the dielectric antenna body, between the external surface and the internal surface of the dielectric antenna body being greater along the optical axis than at a periphery of the dielectric antenna body.

5. The radar level gauge system according to claim 1, a distance between the external surface and the internal surface of the dielectric antenna body being greater along an optical axis of the dielectric antenna body than any other distance, in a direction parallel to the optical axis, between the external surface and the internal surface of the dielectric antenna body.

6. The radar level gauge system according to claim 1, the dielectric antenna body being non-plastic.

7. The radar level gauge system according to claim 6, the dielectric antenna body being made of a ceramic or a glass.

8. The radar level gauge system according to claim 6, the dielectric antenna body being made of an aluminum-based oxide or a silicon-based oxide.

9. The radar level gauge system according to claim 1, the antenna assembly further comprising a microwave-absorbing envelope surrounding a space between the antenna feed and the dielectric antenna body.

10. The radar level gauge system according to claim 9, the microwave-absorbing envelope being made of a high-temperature material, such as a woven or non-woven carbon fiber-based structure or a doped ceramic.

11. The radar level gauge system according to claim 1, the radar level gauge system including:

a tank interface structure for fixing the radar level gauge system to the tank wall; and a housing structure holding the dielectric antenna body in relation to the antenna feed and in relation to the tank interface structure.

12. The radar level gauge system according to claim 11, the dielectric antenna body being attached to the housing structure by a brazing joint.

13. The radar level gauge system according to claim 12, the brazing joint including:

a metal ring with a C-shaped cross-section;

a first joint formed by brazing between the dielectric antenna body and the metal ring; and a second joint formed by brazing or welding between the housing structure and the metal ring.

14. The radar level gauge system according to claim 1, the antenna feed being a conical waveguide section.

15. The radar level gauge system according to claim 1, a center frequency of the transmit signal being higher than 40 GHz.

* * * * *